(12) United States Patent
Choisnet

(10) Patent No.: US 7,036,365 B2
(45) Date of Patent: May 2, 2006

(54) DEVICE FOR MEASURING THE TOTAL PRESSURE OF A FLOW

(75) Inventor: Joël Choisnet, Maveil (FR)

(73) Assignee: Thales, Neuilly sur Seine (FR)

( * ) Notice: Subject to any disclaimer, the term of this patent is extended or adjusted under 35 U.S.C. 154(b) by 38 days.

(21) Appl. No.: 10/481,815

(22) PCT Filed: Apr. 19, 2002

(86) PCT No.: PCT/FR02/01355

§ 371 (c)(1),
(2), (4) Date: Aug. 24, 2004

(87) PCT Pub. No.: WO02/086516

PCT Pub. Date: Oct. 31, 2002

(65) Prior Publication Data

US 2004/0255665 A1 Dec. 23, 2004

(30) Foreign Application Priority Data

Apr. 24, 2001 (FR) .................................. 01 05508

(51) Int. Cl.
*G01P 5/00* (2006.01)
(52) U.S. Cl. .................. 73/170.02; 73/178 R
(58) Field of Classification Search ............ None
See application file for complete search history.

(56) References Cited

U.S. PATENT DOCUMENTS

| 3,415,120 A | | 12/1968 | Hagen et al. |
| 3,705,534 A | * | 12/1972 | Turek ...................... 73/170.14 |
| 4,275,303 A | | 6/1981 | Kalocsay |
| 4,612,814 A | * | 9/1986 | Campman ................ 73/861.72 |
| 4,797,603 A | | 1/1989 | Choisnet |
| 4,972,725 A | | 11/1990 | Choisnet |
| 5,010,775 A | | 4/1991 | Choisnet |
| 5,091,072 A | * | 2/1992 | Tsuchitani et al. ............ 208/39 |
| 5,406,839 A | | 4/1995 | LeBlond et al. |
| 6,091,335 A | | 7/2000 | Breda et al. |
| 6,490,510 B1 | | 12/2002 | Choisnet |
| 6,663,156 B1 | | 12/2003 | Kincaid et al. |

* cited by examiner

*Primary Examiner*—Harshad Patel
(74) *Attorney, Agent, or Firm*—Lowe Hauptman & Berner LLP.

(57) ABSTRACT

The invention relates to the measurement of the total pressure of a fluid flow, especially the total pressure of the airflow surrounding an aircraft. The invention proposes to replace a pitot tube with a device in which at least two fluid streams are taken off from the flow. These streams are brought into contact with each other so as to be mutually slowed down in a region (11) where the pressure is measured. This measured pressure is representative of the total pressure ($P_t$).

21 Claims, 3 Drawing Sheets

DEVICE FOR MEASURING THE TOTAL PRESSURE OF A FLOW

Figure 1:
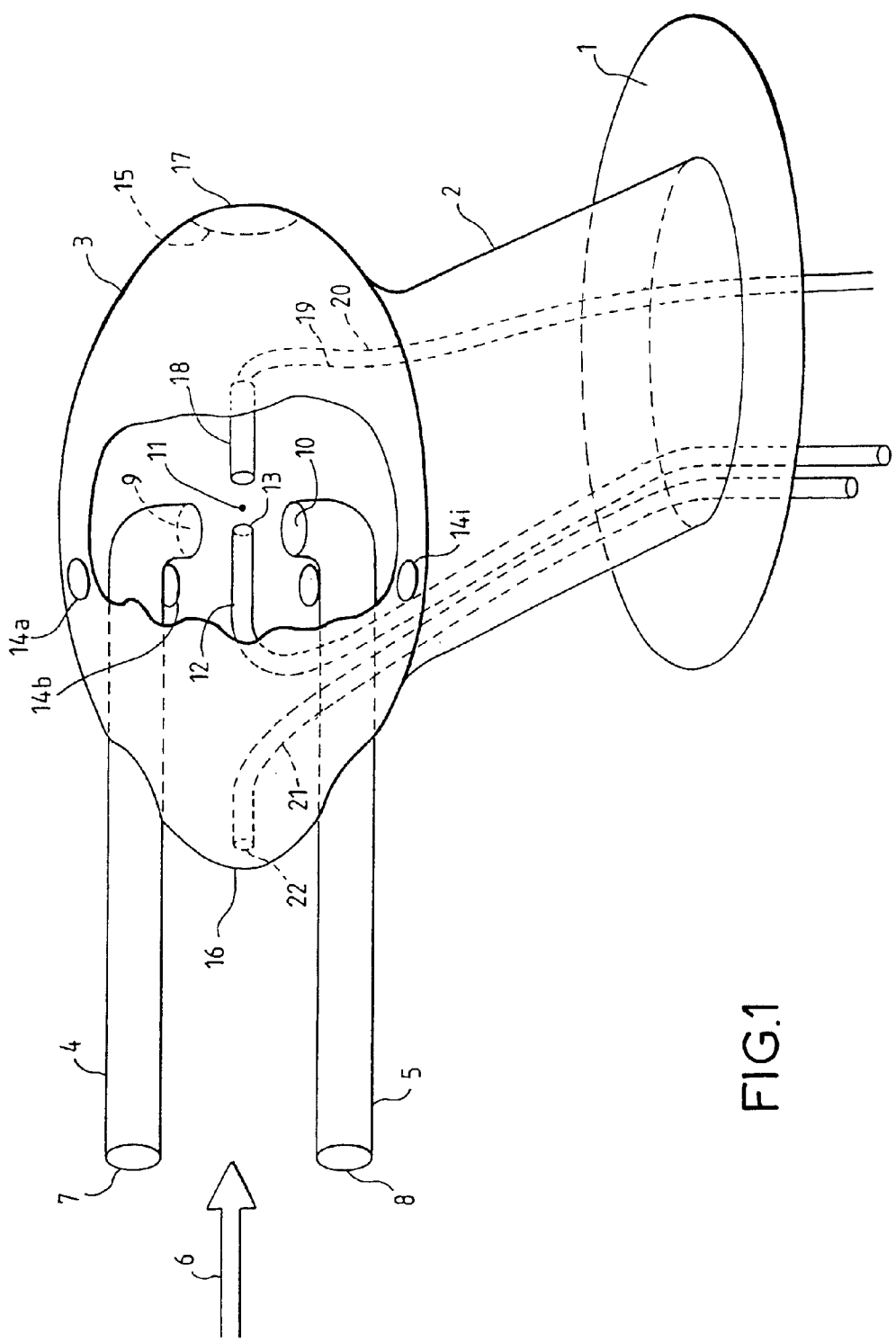

The invention relates to a device for measuring the total pressure of a flow.

The piloting of any aircraft requires its speed relative to the air, that is to say relative to the wind, to be known. This speed is determined using sensors that detect the static pressure $P_s$, the total pressure $P_t$, the angle of attack $\alpha$ and the sideslip angle $\beta$. $\alpha$ and $\beta$ provide the direction of the velocity vector in a reference system or reference frame associated with the aircraft and $(P_t-P_s)$ provides the modulus of this velocity vector. The four aerodynamic parameters therefore make it possible to determine the velocity vector of an airplane and, incidentally, of a tilt-rotor aircraft.

The total pressure $P_t$ is usually measured using a pitot tube. This is a tube open at one of its ends and obstructed at the other. The open end of the tube substantially faces the flow.

Inside the pitot tube, near the obstructed end, there is a means of measuring the air pressure therein. The stream of air penetrating the tube via the open end of the tube is progressively slowed down until it reaches a zero speed in the tube. Reduction in the air speed tends to increase the air pressure. This increased pressure forms the total pressure $P_t$ of the airflow.

In practice, the airflow may convey solid or liquid particles able to penetrate the pitot tube and build up in the tube at the obstructed end. To prevent such a build-up from disturbing the pressure measurement, it is general practice to provide, at the obstructed end, a purge hole via which any particles can escape.

Flowing through this whole are both the particles and some of the air that has entered the pitot tube. Thus, the air is not completely slowed down in the tube and the measurement of the total pressure $P_t$ is distorted thereby. More precisely, the more it is sought to prevent the build-up of large particles, by increasing the dimensions of the purge hole, the more the total pressure measurement is distorted.

Conversely, the more it is sought to improve the measurement of the total pressure $P_t$, by reducing the dimensions of the purge hole, the greater the risk of particle build-up.

With a pitot tube, one is therefore constrained by a compromise between quality of the measurement of the total pressure $P_t$ and the risk of disturbing the measurement because of the particles conveyed by the airflow in which the measurement is made.

The object of the invention is to avoid this compromise, by measuring the total pressure sufficiently without any risk of particle build-up.

Of course, the invention is not limited to a total pressure measurement carried out in an airflow. The invention may be used for any type of fluid flow.

To achieve this object, the subject of the invention is a device for measuring the total pressure of a flow, characterized in that at least two fluid streams taken off from the flow are brought into contact with each other so as to be mutually slowed down in a region and in that it includes means for measuring the pressure within said region.

Figure 2:
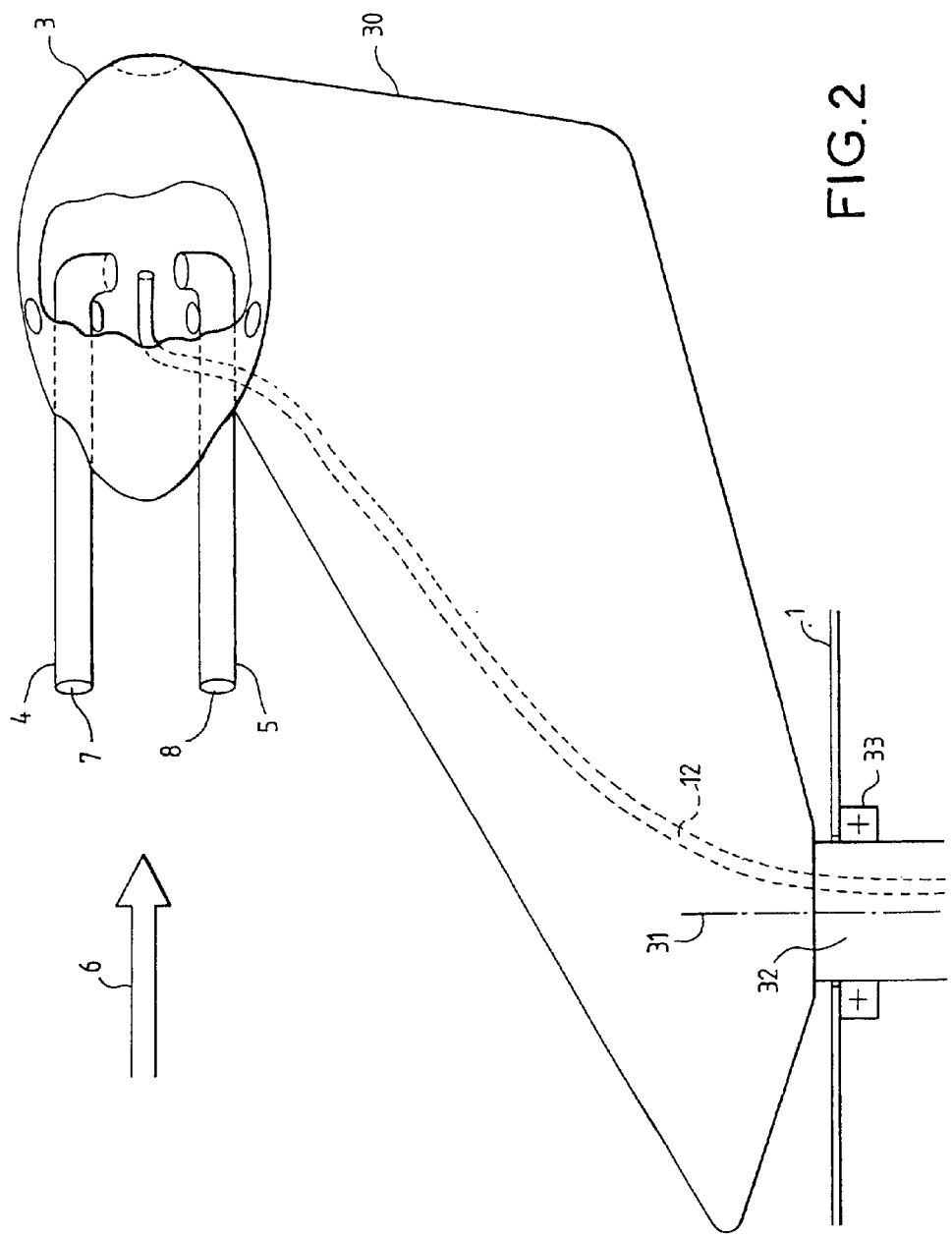
Figure 3:
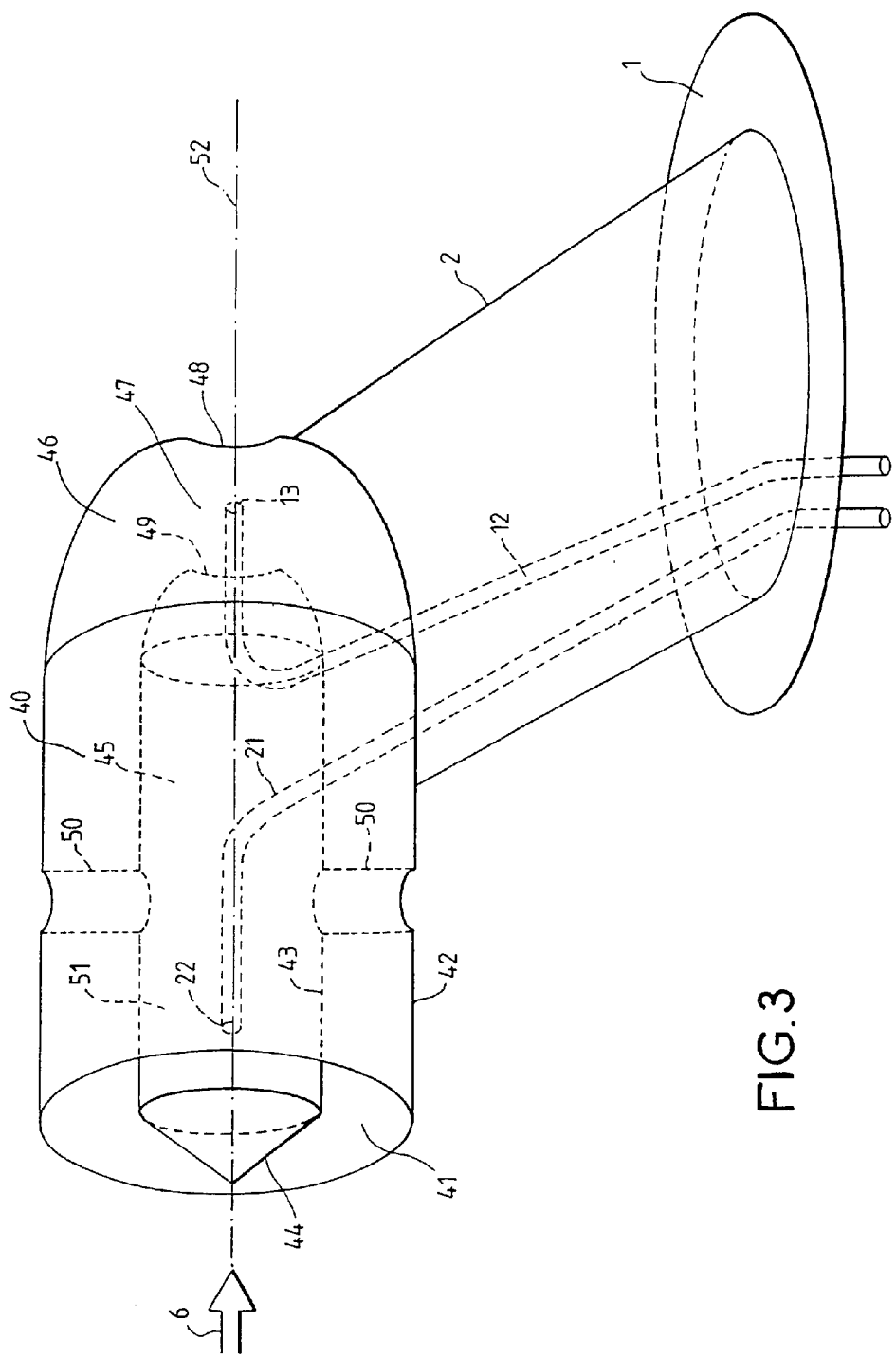

The invention will be more clearly understood and other advantages will become apparent on reading the detailed description of several embodiments of the invention, it being illustrated by the appended drawing in which:

FIGS. 1 and 2 show a first embodiment in which two airstreams are channeled and brought into contact with each other; more precisely, FIG. 1 shows a device according to the invention placed on a probe fixed relative to the skin of an aircraft; FIG. 2 shows the same device as that shown in FIG. 1, but this time placed on a probe that can move relative to the skin of the aircraft; and FIG. 3 shows a second embodiment in which several airstreams are taken off annularly from the flow and then brought into contact with one another.

FIG. 1 shows a device according to the invention, the position of which device is fixed relative to the skin 1 of an aircraft on which it is placed. The device is fastened to a pylon 2, making it integral with the skin 1. The device comprises a hollow body 3 and two tubular channels 4 and 5. The device is located in an airflow whose axis is shown by the arrow 6. The channels 4 and 5 each have an upstream open end, 7 and 8 respectively. Near these ends, the channels 4 and 5 open approximately along the axis 6 of the flow. Near their upstream end 7, 8, the channels 4 and 5 are approximately parallel. The channels 4 and 5 each have a downstream open end, 9 and 10 respectively. Inside the hollow body 3, the ends 9 and 10 face each other, and a region 11 is located between the ends 9 and 10. Two airstreams taken off from the flow are guided by the channels 4 and 5 upstream of the region 11. In the region 11, the two airstreams are brought into contact with each other so as to be mutually slowed down.

The pressure of the air within the region 11 is representative of the total pressure $P_t$ within the flow. This pressure $P_t$ is measured, for example, by means of a tube 12 that opens at its first end 13 into the region 11. The tube 12 is connected at its second end to pressure measurement means such as, for example, a pressure sensor. This pressure sensor may be located inside the aircraft, in which case the tube 12 extends from the inside of the hollow body 3 as far as the interior of the aircraft, passing through the pylon 2.

The hollow body 3 includes orifices 14a to 14i and 15 for discharging the airstreams from the hollow body 3. These orifices 14a to 14i and 15 are positioned on the hollow body 3 in such a way that, when the channels 4 and 5 are obstructed, a pressure approximately equal to the static pressure $P_s$ of the flow obtains within the hollow body 3.

More precisely, in the example shown in FIG. 1, the hollow body 3 has a shape that is approximately axisymmetric and elongate along an axis approximately parallel to the axis 6 of the flow.

At its upstream end 16, the hollow body has a relatively small cross section (perpendicular to the axis 6). Upon moving away from the upstream end 16, the cross section of the hollow body 3 increases up to a maximum and then decreases down to a downstream end 17 of the hollow body 3. The region 11 in which the total pressure $P_t$ is measured lies within the hollow body 3 approximately at the point at which the cross section of the hollow body 3 is the largest. The orifices 14a to 14i are located on the skin of the hollow body 3, also approximately where the cross section is largest. The orifices 14a to 14i surround the region 11. As regards the orifice 15, this is located at the downstream end 17 of the hollow body 3.

Advantageously, the device includes means for measuring the temperature within the region 11. For example, a temperature probe, in the form of a platinum resistance thermometer 18, may be placed in the region 11. This resistance thermometer is connected by electrical connections 19 and 20 to electrical resistance measurement means, these means being located, for example, in the aircraft. Just like the tube 12, the electrical connections may pass through the pylon 2.

The temperature within the region 11 is representative of the total temperature of the flow. In the region 11, the airstreams are sufficiently slowed down to allow the total temperature to be measured. On the other hand, the air that has slowed down is permanently replenished with the air flowing in the channels 4 and 5 and then discharged via the orifices 14a to 14i and 15 in such a way that the resistance thermometer 18 is exposed to a gentle flow of air. Thus, the resistance thermometer 18 does not heat up by the Joule effect, or does so only very slightly, and gives a correct temperature measurement because of this forced convection.

Advantageously, the dimensions of the device are such that the region 11 lies away from any boundary layer. More precisely, the pressure measurement is disturbed if the pressure probe, in this case the end 13 of the tube 12, lies within a boundary layer. It will be recalled that a boundary layer is a region in which a flow is disturbed by a wall. For example, the pylon 2 must have a length sufficient for the ends 7 and 8 of the channels 4 and 5 not to be located in the boundary layer formed by the skin 1 of the aircraft. In addition, the walls of the channels 4 and 5 form, inside the latter, a boundary layer that forms when airstreams of the flow are flowing along the inside of the channels 4 and 5. It is therefore important to define the dimensions of the channels 4 and 5 so that a boundary layer that forms therein does not penetrate the entire cross section of the channels 4 and 5 at their downstream ends 9 and 10, so as to keep the region 11 away from any boundary layer. More particularly, attention shall be paid to the ratio of the length of the channels 4 and 5 to their cross section, and to the radius of curvature of the channels 4 and 5, which curvature allows the airstreams flowing in the channels 4 and 5 to come into contact with each other. This radius of curvature must not be too small.

Advantageously, it is also possible to measure the static pressure $P_s$ of the flow inside the hollow body 3, for example near its upstream end 16. For this purpose, the static pressure may be measured using a tube 21 whose first end 22 emerges in a region lying inside the hollow body 3 where a pressure representative of the static pressure $P_s$ obtains. The tube 21 is connected at its second end to pressure measurement means such as, for example, a pressure sensor. This sensor may be located inside the aircraft, in which case the tube 21 extends from the hollow body 3 right inside the aircraft, passing through the pylon 2.

In the embodiment shown in FIG. 1, the two channels 4 and 5 form a plane approximately perpendicular to the skin 1 of the aircraft. Of course, it is possible for the plane containing the channels 4 and 5 to have any other orientation with respect to the skin 1 of the aircraft. The plane containing the channels 4 and 5 may be approximately parallel to the skin of the aircraft. This orientation makes it possible to reduce the size of the device which will thus protrude less from the skin 1 of the aircraft. The distance of the plane containing the channels 4 and 5 from the skin of the aircraft may be determined so that it is outside the boundary layer formed by the flow along the skin 1 of the aircraft.

In contrast, when the two channels 4 and 5 form a plane approximately perpendicular to the skin 1 of the aircraft, a variation in the local angle of incidence of the flow will result in identical perturbations of the two channels 4 and 5. Such a variation will therefore not result in a lack of symmetry in the position of the region 11. On the other hand, when the two channels 4 and 5 form a plane approximately parallel to the skin 1 of the aircraft, there is a risk of a local variation in the angle of incidence disturbing the airstream penetrating one of the channels 4 or 5, which perturbation is due to the presence of the other channel. It will be recalled that a local variation in the angle of incidence is a variation in the direction of the velocity vector of the flow, namely a variation in the direction of the axis 6, in a plane parallel to that of the skin 1 of the aircraft.

FIG. 2 shows another embodiment of the invention in which the channels 4 and 5, fastened to the hollow body 3, have a position that can move relative to the skin 1 of the aircraft. For the arrangement of the hollow body 3 and of the channels 4 and 5, the reader may refer to FIG. 1. In FIG. 2, the hollow body 3 is fastened to a blade 30 that can move about an axis 31. The blade 30 is designed to be naturally oriented according to the local angle of incidence of the flow. The blade 30 is fastened to a shaft 32 approximately perpendicular to the skin 1 of the aircraft. A bearing 33, for example a rolling bearing, allows the shaft 32 to rotate easily relative to the skin 1 of the aircraft, while still being precisely positioned according to the degrees of freedom other than the rotation about the axis 31.

When the pressure sensor connected to the tube 12 is located inside the skin 1 of the aircraft, it is advantageous to interpose, between the tube 12 and the sensor, a rotary seal (not shown in FIG. 2) so as to keep the pressure sensor in a fixed position relative to the aircraft.

The device shown in FIG. 2 may also include a pressure probe capable of measuring a pressure representative of the static pressure $P_s$ of the flow and a temperature sensor for measuring the total temperature of the flow, as shown in FIG. 1. To connect the static pressure probe and the temperature sensor, the rotary seal may have several channels, aeraulic channels for the pressure measurements and an electrical channel for the temperature measurements.

Advantageously, when the blade 30 is oriented along the axis of the flow, it is possible to measure the orientation of the blade, for example by means of an optical encoder that measures the angle of the blade 30; the position of the blade 30 may be mechanically slaved according to incidence pressure measurements of the blade 30 relative to the flow. For more details regarding the way in which the angular position of the blade 30 about the axis 31 is measured, the reader may refer to French Patent Application FR 2 665 539.

By orienting the channels 4 and 5 along the axis 6 of the flow, even when this axis 6 varies relative to the aircraft, it is possible to improve the pressure measurement representative of the total pressure $P_t$ made by the device. This is because, when the axis 6 is inclined relative to the orientation of the channels 4 and 5 near their upstream open ends 7 and 8, a boundary layer may form inside the channels 4 and 5, which layer is greater the higher the angle of inclination of the axis 6 relative to the channels 4 and 5. The boundary layer may disturb the pressure measurements.

In the embodiment shown in FIG. 3, several airstreams are taken off annularly from the flow and guided in one and the same channel 40. More precisely, near its upstream open end 41, the channel 40 has an approximately tubular shape. The channel 40 is located between an outer cylindrical wall 42 and an inner cylindrical wall 43. At the end 41, the inner cylindrical wall 43 is closed, for example by a conical surface 44 that defines an internal volume 45 whose function will be seen later. The channel 40 near its downstream end 46 closes up around a region 47 where the various airstreams flowing in the channel 40 are brought into contact with each other so as to be mutually slowed down.

The channel 40 includes, at its downstream end 46, orifices 48 and 49 for discharging the air from the region 47. The orifice 48 is located in the extension of the outer wall 42 and allows the airstreams to be discharged from the region 47 directly into the flow along the direction of the axis 6. The orifice 49 is located in the extension of the inner wall 43 and allows the airstreams to be discharged from the region 47 in the opposite direction to that of the axis 6. The streams of air discharged via the orifice 49 emerge in the inner volume 45. The inner volume 45 communicates with the flow by means of radial channels 50 that pass through the channel 40. In FIG. 3, only two radial channels have been shown. Of course, the invention is not limited to this number. This or these radial channels 50 furthermore allow mechanical retention of the inner wall 43. They must have a cross section sufficient to allow the airstreams coming from the orifice 49 to be discharged into the airflow external to the device. The radial channel or channels 50 must not have too large a cross section, as this would disturb the flow of the airstreams in the channel 40.

As in the embodiments shown in FIGS. 1 and 2, the orifice 13 of a tube 12 makes it possible to produce a pressure probe in the region 47. The outer wall 42 is fastened to the pylon 2, through which the tube 2 extends. Likewise, another pressure probe may be provided for measuring a pressure representative of the static pressure $P_s$ of the flow. It has been found that it is possible to measure such a pressure in the inner volume 45 in a space 51 lying between the conical surface 44 and the radial channel or channels 50. The end 22 of the tube 21 is placed for this purpose in the space 51. It is also possible to provide means for measuring the temperature within the region 47. In order not to clutter up the figure, these means have not been shown in FIG. 3. They may take the form of the temperature sensor 17 shown in FIG. 1.

The channel 40 formed between the walls 42 and 43 has been shown in a fixed position relative to the skin 1 of the aircraft. It is also possible, as in the embodiment shown in FIG. 2, to fasten the channel 40 to a moveable blade 30 so as to improve the alignment of the channel 40 relative to the axis 6 of the flow when the aircraft changes its direction relative to the axis 6 of the flow.

The embodiment shown in FIG. 3 advantageously exhibits symmetry of revolution about an axis 52 oriented along the preferred axis of the airflow, said axis being shown by the arrow 6.

The embodiment shown in FIG. 3 has the advantage of being more compact than the embodiments shown in FIGS. 1 and 2. The more compact the embodiment, the easier it is to heat the device in order to prevent the formation of ice, in the event of flying at high altitude. To heat the device, it is possible to use, for example, electrical resistance heating elements incorporated into the walls 42 or 43, especially the outer wall 42. The more compact the embodiment, the smaller the amount of electrical power needed for heating.

The invention claimed is:

1. A device for measuring the total pressure ($P_t$) of a flow, comprising:
    at least a first channel and a second channel having a first fluid stream and a second fluid stream, respectively, flowing therethrough, wherein said fluid streams are taken off from the flow through said first and second channels, and are brought into contact with each other so as to be mutually slowed down in a region; and
    means for measuring the pressure within said region.

2. The device as claimed in claim 1, wherein at least one of the channels has an upstream open end, which is approximately oriented along the axis of the flow.

3. The device as claimed in claim 2, wherein said channels are positioned upstream of said region.

4. The device as claimed in claim 3, wherein the upstream ends of said channels are approximately parallel.

5. The device as claimed in claim 4, wherein the channels each have a downstream open end, the downstream open ends face each other, and said region is located between the downstream open ends.

6. The device as claimed in claim 4, further comprising a hollow body in which said region is located and into which the channels run, wherein the hollow body includes orifices for discharging the fluid streams from the hollow body.

7. The device as claimed in claim 4, further comprising fixing means for fixing said channels relative to the skin of an aircraft.

8. The device as claimed in claim 4, further comprising orienting means for orienting said upstream end along the axis of the flow, said at least one of the channels being fastened to said orienting means.

9. The device as claimed in claim 3, wherein the channels each have a downstream open end, the downstream open ends face each other, and said region is located between the downstream open ends.

10. The device as claimed in claim 9, further comprising a hollow body in which said region is located and into which the channels run, wherein the hollow body includes orifices for discharging the fluid streams from the hollow body.

11. The device as claimed in claim 3, further comprising a hollow body in which said region is located and into which the channels run, wherein the hollow body includes orifices for discharging the fluid streams from the hollow body.

12. The device as claimed in claim 11, wherein the orifices of the hollow body are positioned in such a way that, when the channels are obstructed, a pressure approximately equal to the static pressure (Ps) of the flow obtains within the hollow body.

13. The device as claimed in claim 2, further comprising fixing means for fixing said channels relative to the skin of an aircraft.

14. The device as claimed in claim 2, further comprising orienting means for orienting said upstream end along the axis of the flow, said at least one of the channels being fastened to said orienting means.

15. A device for measuring the total pressure ($P_t$) of a flow, comprising:
    an annular channel having multiple fluid streams flowing therethrough, wherein said fluid streams are taken off annularly from the flow, guided through said annular channel, and are brought into contact with each other so as to be mutually slowed down in a region; and
    means for measuring the pressure within said region.

16. The device as claimed in claim 15, wherein the channel, near an upstream end thereof, has an approximately tubular shape.

17. The device as claimed in claim 15, wherein the channel, near a downstream end thereof, closes up around said region.

18. The device as claimed in claim 15, wherein the channel includes, at a downstream end thereof, orifices for discharging the fluid from said region.

19. The device as claimed in claim 15, wherein said device further includes means for measuring the temperature in said region.

20. The device as claimed in claim 13, said fixing means being sized such that said region is located away from any boundary layer formed by the skin of the aircraft.

21. The device as claimed in claim 1, wherein said device further includes means for measuring the temperature in said region.

* * * * *